(12) United States Patent
Ebner et al.

(10) Patent No.: US 9,714,078 B2
(45) Date of Patent: Jul. 25, 2017

(54) AIRCRAFT WINDOW INSTALLATION METHOD

(71) Applicant: The Boeing Company, Chicago, IL (US)

(72) Inventors: James E. Ebner, Chicago, IL (US); Eric Allen Bryan, Chicago, IL (US); Jeffrey Lee Kelsey, Chicago, IL (US)

(73) Assignee: THE BOEING COMPANY, Chicago, IL (US)

( * ) Notice: Subject to any disclaimer, the term of this patent is extended or adjusted under 35 U.S.C. 154(b) by 249 days.

(21) Appl. No.: 14/611,605

(22) Filed: Feb. 2, 2015

(65) Prior Publication Data

US 2015/0143684 A1  May 28, 2015

Related U.S. Application Data

(62) Division of application No. 13/071,823, filed on Mar. 25, 2011, now Pat. No. 8,944,381.

(51) Int. Cl.
*B21D 53/92* (2006.01)
*B64C 1/14* (2006.01)

(52) U.S. Cl.
CPC ............... *B64C 1/14* (2013.01); *B21D 53/92* (2013.01); *B64C 1/1492* (2013.01); *Y10T 29/49826* (2015.01); *Y10T 29/49876* (2015.01)

(58) Field of Classification Search
CPC ............ Y10T 29/49876; B64C 1/1484; B64C 1/1492; B21D 53/92
USPC .......................... 244/119, 121, 129.3; 52/204
See application file for complete search history.

(56) References Cited

U.S. PATENT DOCUMENTS

| | | | |
|---|---|---|---|
| 2,409,808 | A | 10/1946 | Sowle |
| 4,541,595 | A | 9/1985 | Fiala et al. |
| 5,271,581 | A | 12/1993 | Irish |
| 6,786,453 | B2 | 9/2004 | Jones |
| 6,789,765 | B2 | 9/2004 | Hopkins et al. |
| 6,793,182 | B2 | 9/2004 | Hopkins et al. |
| 7,028,950 | B2 | 4/2006 | Salmon et al. |
| 7,281,686 | B2 | 10/2007 | Wood |
| 7,552,896 | B2 | 6/2009 | Coak |
| 7,562,846 | B2 | 7/2009 | Wood |
| 7,578,474 | B2 | 8/2009 | Balsillie |
| 7,661,626 | B2 | 2/2010 | Wood |
| 7,823,833 | B2 | 11/2010 | Wood |
| 8,449,709 | B2 | 5/2013 | Modin et al. |
| 2001/0027848 | A1 | 10/2001 | Mullet et al. |

(Continued)

FOREIGN PATENT DOCUMENTS

| | | |
|---|---|---|
| WO | 2006/132736 | 12/2006 |
| WO | 2008/109217 | 9/2008 |

OTHER PUBLICATIONS

State Intellectual Property Office of PRC; Office Action issued in Chinese Patent Application No. 201280014430.8; dated Feb. 5, 2015 (with English translation).

(Continued)

*Primary Examiner* — Jermie Cozart
(74) *Attorney, Agent, or Firm* — Parsons Behle & Latimer

(57) ABSTRACT

An aircraft window has an inner window assembly retained on an outer window assembly by a plurality of interlocking clips and receptacles positioned around the perimeter of the window. The interlocking clips and receptacles produce a retention force that compresses a seal against an outer structural the window to seal an internal cavity between the inner and outer window assemblies.

18 Claims, 12 Drawing Sheets

(56) References Cited

U.S. PATENT DOCUMENTS

| | | |
|---|---|---|
| 2007/0034743 A1 | 2/2007 | Albers et al. |
| 2007/0095984 A1 | 5/2007 | Wood |
| 2007/0102580 A1 | 5/2007 | Wood |
| 2007/0181746 A1 | 8/2007 | Wood |
| 2008/0217479 A1 | 9/2008 | Wood |
| 2011/0016823 A1 | 1/2011 | Wood |

OTHER PUBLICATIONS

Japanese Patent Office; Office Action issued in Japanese Patent Application No. 2014-501070 dated Jan. 5, 2016.
International Search Report issued in PCT/US2012/024721 dated Jun. 29, 2012.
United States Patent and Trademark Office; Office Action issued in U.S. Appl. No. 13/071,823 dated Jul. 3, 2014.
United States Patent and Trademark Office; Office Action issued in U.S. Appl. No. 13/071,823 dated Dec. 17, 2013.

AIRCRAFT WINDOW INSTALLATION METHOD

CROSS REFERENCE TO RELATED APPLICATIONS

The present application is a divisional of U.S. patent application Ser. No. 13/071,823, filed on Mar. 25, 2011 and now U.S. Pat. No. 8,944,381 B2 entitled "Aircraft Window and Installation Method," the disclosure of which is incorporated herein by reference in its entirety.

TECHNICAL FIELD

The present disclosure generally relates to window assemblies, and deals more particularly with a window for aircraft, and a related method of window installation.

BACKGROUND

Windows used in aircraft having pressurized cabins may be required to withstand substantial pressure differentials during flight, while insulating the cabin interior from harsh exterior environments. To satisfy these requirements, a window assembly has been used that comprises an outboard structural window mounted on the aircraft's exterior skin and an inboard transparent window mounted on interior cabin sidewall panels. A cavity between the two windows is sealed by a peripheral seal that is compressed against the outboard structural window by the interior side wall panel that surrounds the window opening. The window is assembled and installed using a combination of frictional fit, spring clips between the structural window and the seal.

The window assembly described above may have some challenges in some applications. For example, if the sidewall panels are not supported locally around the perimeter, this may reduce compression of the seal against the outboard structural window. Another challenge of the prior window assembly is it may allow moisture buildup on surfaces inside the window cavity. In addition, the prior window assembly is relatively time consuming to install and may not provide the installer with an audible indication of whether the seal has been adequately seated against the structural window and compressed with a sufficient amount of compressive force on the seal.

Accordingly, there is a need for a window and related installation method, especially for aircraft that both simplifies the installation process and improves the seal around the structural window in order to reduce moisture within the window cavity.

SUMMARY

The disclosed embodiments provide a window construction and related method for installing the window on an aircraft. The window provides improved sealing that may reduce or eliminate condensation and frost buildup within an internal window cavity. The window may increase the compression of a seal against an outer structural window to form a substantially air tight seal around the window cavity. The window construction includes snap fit, interlocking retention clips and receptacles that may reduce installation time and provide the installer with an audible signal when the window assembly has been properly installed.

According to one disclosed embodiment, an aircraft window is provided comprising an outer window assembly, an inner window assembly, a seal, and a plurality of retaining features. The retaining features comprise interlocking clips and receptacles. The seal is adapted to seal the perimeter of the window assembly against the outer window assembly. The interlocking clips and receptacles are disposed around the perimeter of the window for retaining the inner window assembly on the outer window assembly and for forcing the seal against the outer window assembly. The aircraft window may further comprise a window frame adapted to be mounted on an aircraft and surrounding the window, wherein the seal is secured to the inner window assembly, the clips are secured to the seal and the receptacles are attached to the frame. The window frame includes a plurality of brackets around its perimeter. The receptacles are mounted on the brackets and each includes a socket. The clips each include a plug receivable in snap-fit relationship within a corresponding one of the receptacle sockets. Each of the receptacles includes a flexible guide for guiding a portion of the clip plug into the receptacle. The outer window assembly may comprise a structural outboard window, and the inner window assembly may include an electrically dimmable inboard window spaced from the outboard window to form an internal window cavity that is sealed by the seal.

According to another disclosed embodiment, a window for an aircraft fuselage comprises a window frame adapted to be secured to the fuselage, an outer structural window mounted on the window frame, and an inner window spaced inboard of the outer structural window to form a cavity between the inner and outer windows. The window further comprises a seal extending around the window cavity for sealing the cavity, and a plurality of retaining features which may comprise snap-fit connections for retaining the inner window on the window frame. The window frame may include a plurality of brackets secured around the periphery of the frame. The retaining features may include a plurality of spring clips, a receptacle on each of the spring clips, a plurality of retention clips attached to the seal and a plug on the end of each of the retention clips that may be snapped into one of the receptacles. The receptacles are attached to the window frame and the clips with plugs are attached to the seal.

According to still another embodiment, a window comprises a window, a window frame around the window, at least one receptacle mounted on the frame and a window assembly. The window assembly includes at least one retention clip insertable into the receptacle for holding the window assembly on the window frame during installation of the window assembly on the window frame. The receptacle includes a socket including an opening therein having a width less than the maximum internal width of the socket, and the retention clip includes a plug having a width less than that of the opening in the socket. The socket may include flexible guides on opposite sides of the socket opening for guiding the plug into the socket during the installation.

According to another embodiment, an aircraft window comprises an inner window assembly adapted to be installed on an outer window assembly. A seal is adapted to be compressed between the inner and outer window assemblies. A plurality of retaining features retain the inner window assembly on the outer window assembly and produce an audible indication when the seal has been sufficiently compressed during the installation.

According to a further embodiment, a method is provided of installing a window in an aircraft fuselage. The method comprises mounting a window frame on the fuselage and installing a plurality of receptacles on the window frame around the perimeter of the window. The method further includes installing a seal on a window assembly and mounting a plurality of retention clips on the window assembly. The method also includes installing the window assembly on the window frame by respectively inserting the retention clips into the receptacles. Installing the window assembly may include aligning the retention clips respectively with the receptacles and compressing tabs on the retention clips to force plugs on the clips into sockets on the receptacles. Compression of the tabs is continued until an audible snap is produced by the receipt of the plugs into the sockets.

Other features, benefits and advantages of the disclosed embodiments will become apparent from the following description of embodiments, when viewed in accordance with the attached drawings and appended claims

BRIEF DESCRIPTION OF THE ILLUSTRATIONS

DETAILED DESCRIPTION

Figure 1:
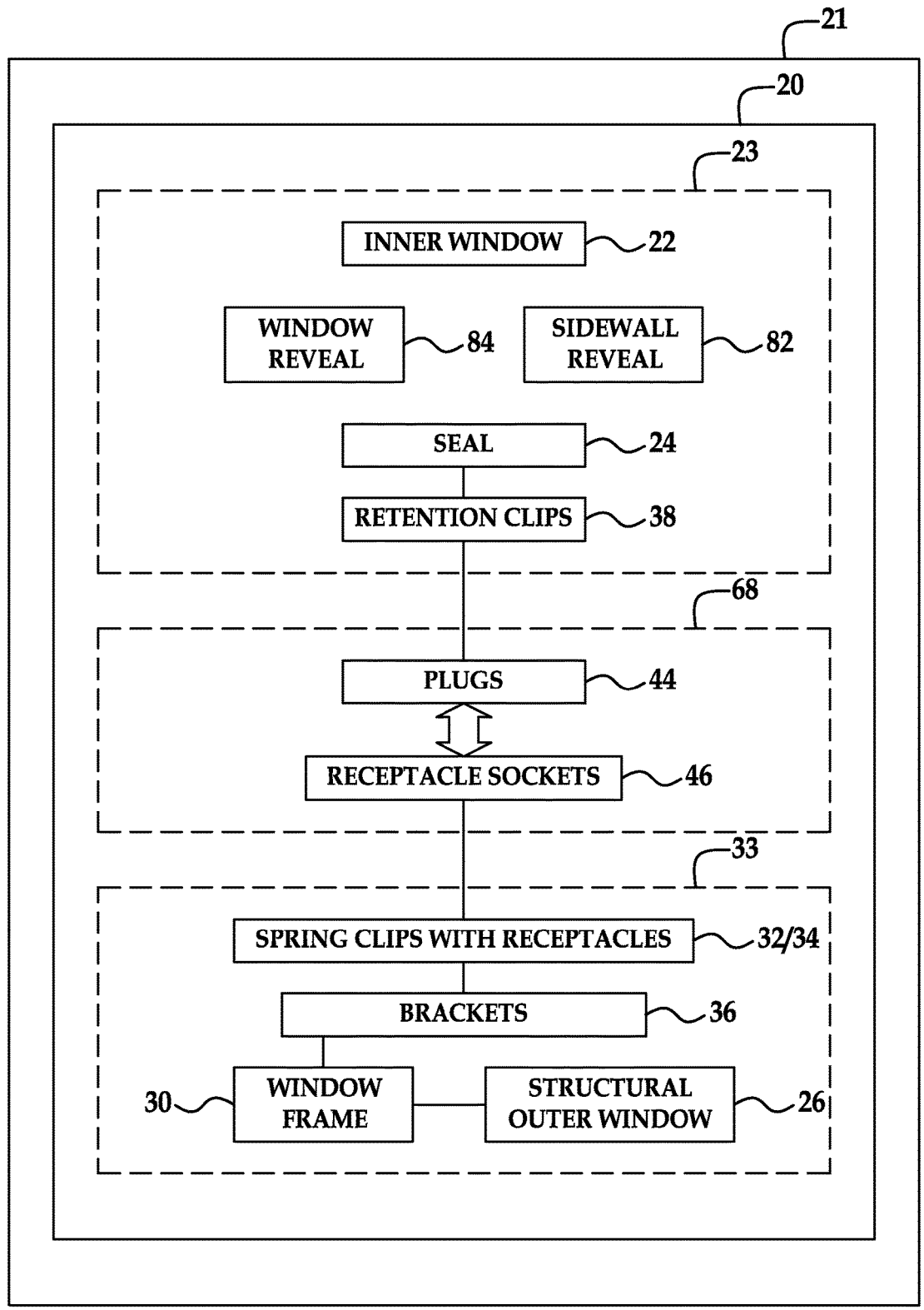
FIG. 1 is a functional block diagram of an aircraft window according to the disclosed embodiments.
Figure 2:
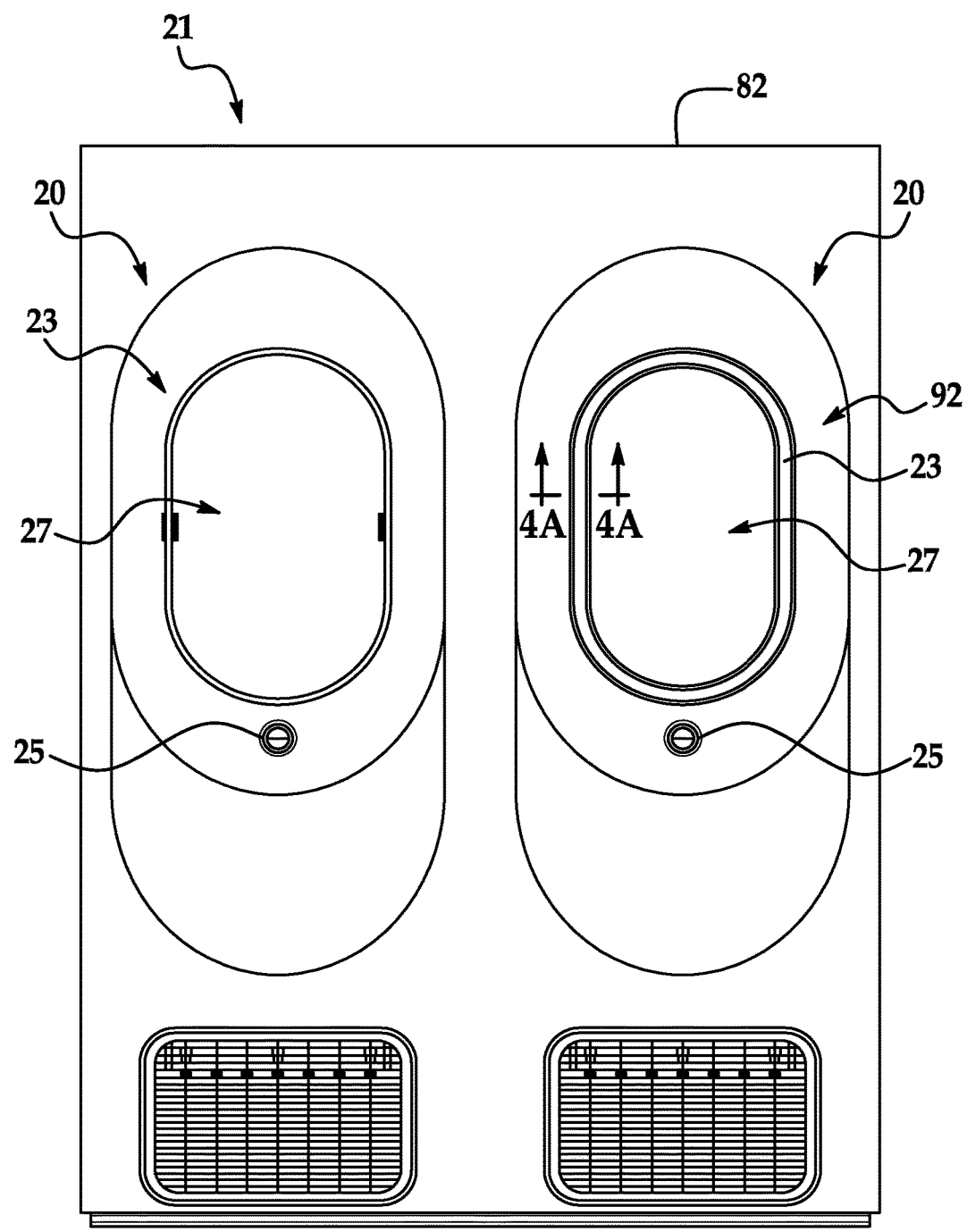
FIG. 2 is an illustration of an interior elevation of a pair of electronically dimmable aircraft windows, the interior reveal of one of the windows has been removed for clarity.
Figure 3:
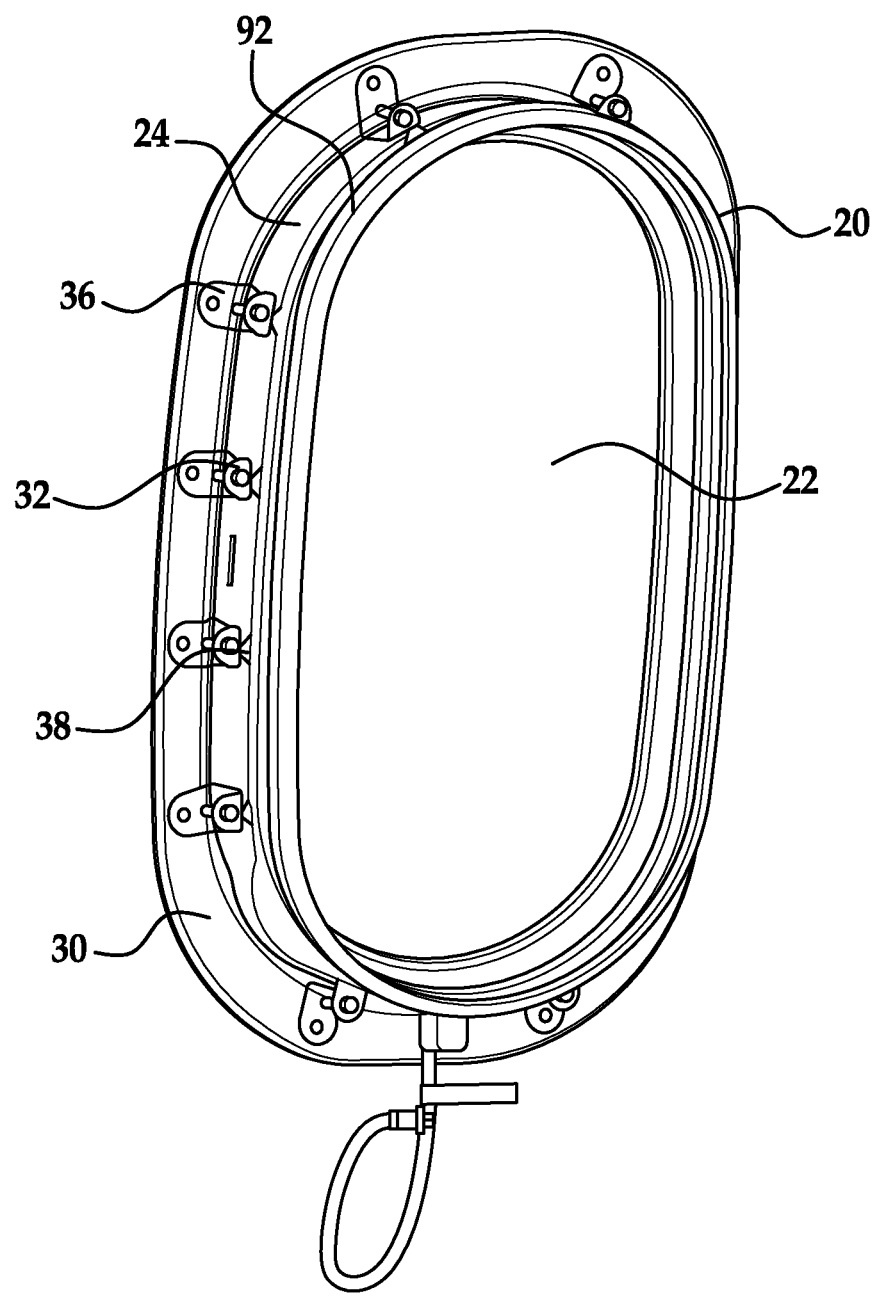
FIG. 3 is an illustration of a perspective view of the interior side of one of the windows shown in FIGS. 1 and 2, the sidewalls and reveals not shown for clarity.

Referring to FIGS. 1 and 2, one or more windows 20 are installed on the fuselage 21 of an aircraft (not shown). Each of the windows 20 may include an inner window assembly 23 mounted on interior side wall panel assembly 82 forming part of a cabin (not shown) within the fuselage 21. The inner window assembly 23 includes a peripheral inner reveal assembly 84 surrounding a window opening 27 (FIG. 2). In some embodiments, the window 20 may comprise an electronically dimmable window 22 (see FIG. 4A) whose transparency can be electrically controlled. For example and without limitation, passengers or crew may control the dimmable window 22 using an electrical switch 25 located beneath each window 20 on the sidewall panel assembly 82, or located remotely.

Referring now to FIGS. 1, 3 and 4A and 4B, the window 20 broadly comprises an inner window assembly 23 that is retained on an outer window assembly 33 (see FIG. 4A) by a plurality of snap-fit retaining and locking features 68. The outer window assembly 33 includes an outboard structural window 26 mounted on a frame 30 that is attached by any suitable means (not shown) to the outer skin 86 of the aircraft. A suitable structural window seal 28 forming part of the outer window assembly 33 is captured between the structural window 26 and the frame 30 to form a substantially air tight seal around the periphery of the structural window 26. The outer window assembly 33 also includes a plurality of structural window support brackets 36, which are substantially L-shaped in cross section and are mounted by any suitable means such as fasteners (not shown), to the frame 30 about the latter's periphery. A spring clip 32 is mounted on each of the brackets 36 by means of a spring fastener 96. A receptacle 34 is mounted on one end of each of the spring clips 32 at the periphery of the structural window 26.

The inner window assembly 23 includes an inboard window or lens 22 and a compressible seal 24 that extends around the perimeter of the inner window assembly 23 and may be formed of any suitable material. The outer perimeter of the inboard window 22 is held within the seal 24. The seal 24 is spaced inboard of the outboard structural window 26 to form an outboard window cavity 80. The seal 24 has a tear-shaped outboard portion 78 that contacts and is sealed against the structural window 26 to form an air-tight seal around the outboard window cavity 80. Although not shown in the figures, the tear-shaped portion 78 may fold as it contacts and is compressed against the window 26, resulting in a seal that has more surface area while permitting the seal 24 to open slightly and "burp" to bleed and release air when the air pressure inside the cavity becomes too great and exceeds a preselected value. The seal 24 may also include an inboard bellows seal 88 forming a seal against a reveal assembly 84 that comprises an outboard reveal 90 and the inboard reveal 92.

The inner window assembly 23 may further include an inboard reveal window 94, a reveal assembly 84 having an inboard reveal 92 and a plurality of retention clips 38. The periphery of the reveal window 94, also sometimes referred to as a dust cover, is captured within the reveal assembly 84 in the space inboard of the inboard window 22. The upper end of the seal 24 includes a bellows portion 88 that is sealed against the reveal assembly 84.

Each of the retention clips 38 is bonded to or may be molded within the peripheral seal 24. One end of each of the retention clips 38 includes a finger tab 40, and the other end of the retention clip 38 includes a plug 30 that is received in snap-fit relationship within the receptacle 34.

Figure 4A:
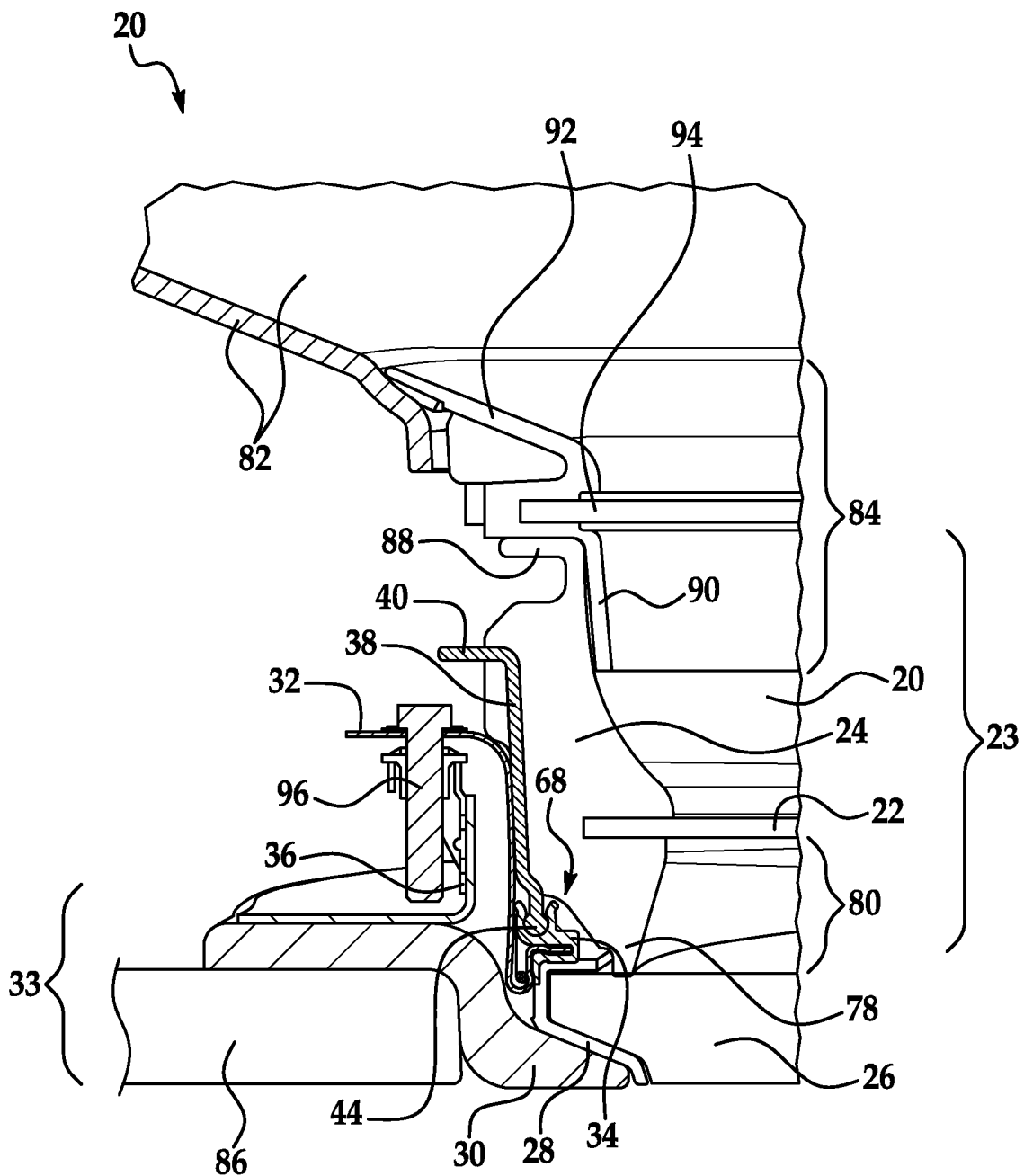
FIG. 4A is an illustration of a sectional view taken along the line 4A-4A in FIG. 2.
Figure 4B:
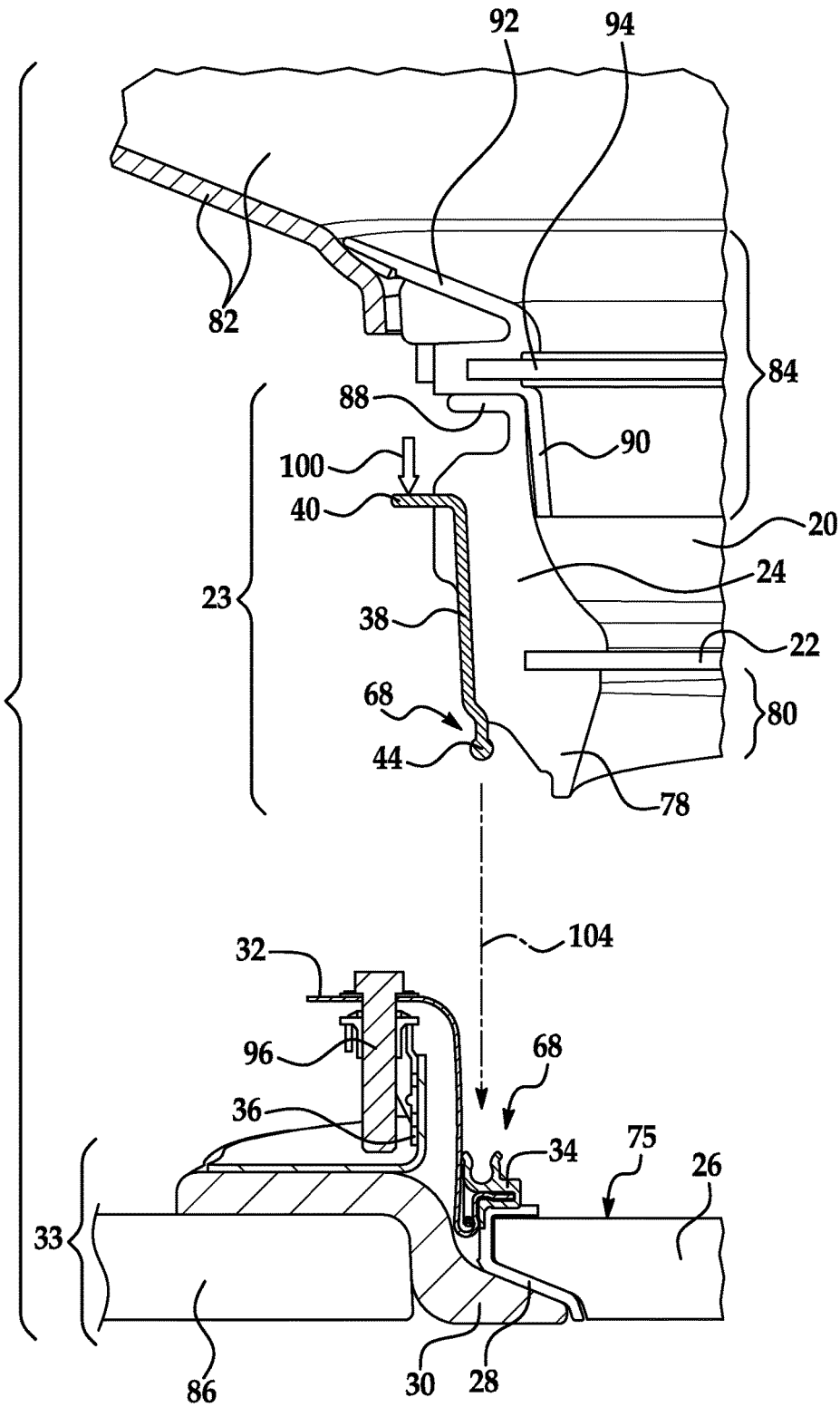
FIG. 4B is an illustration similar to FIG. 4A but exploded to show the separate inner and outer window assemblies.

FIG. 4B shows the relative alignment between the inner and outer window assemblies 23, 33, and particularly the retention clips 38 and the receptacles 34 during the installation of the window 20. During the installation process, the inner and outer window assemblies 23, 33 are aligned such that the plugs 44 on the retention clips 38 are approximately aligned along a line shown at 104, with the corresponding receptacles 34 that are mounted on the window frame 30. Following initial contact of the plugs 44 with receptacles 34, the installer may press on the finger tabs 40 to apply force shown at 100 which forces the plugs 44 into the receptacles 34, thereby retaining the inner window assembly 23 on the frame 30 while generating a retention force that compresses the outboard end 78 of the seal 24 against the interior surface 75 of the structural window 26.

Attention is now directed to FIGS. 5, 6 and 7A-7C which illustrate additional details of the snap-fit interlocking connections between the inner and outer window assemblies 23, 33 shown in FIGS. 4A and 4B. The spring clip 32 includes an upper apertured end 32a and a lower spring bend 50 connected by a slightly curved section 32b. The spring clip 32 may be manufactured of any suitable material such as metal that has spring like characteristics. A spring tab 48 extending from the spring bend 50 is received within a spring tab pocket 54 in the receptacle 34.

The retention clip 38 includes a substantially flat bonding surface 76 and may include wing tabs 42 to increase the surface bonding area of the retention clip 38 when it is bonded to the seal 24 (FIGS. 3A, 3B). Referring particularly to FIGS. 5, 6, 7A, 7B and 7C, the receptacle 34 may be manufactured of any suitable material that has flexible, spring like characteristics, such as, without limitation, a thermoplastic. The receptacles includes a pair of facing retention knobs 52 respectively on flexible end wall flanges 66. The retention knobs 52 are received within opposite open ends 53 of the spring bend 50 in spring clip 32 and function to assist in retaining the receptacle 34 on the spring clip 32.

Figure 7A:
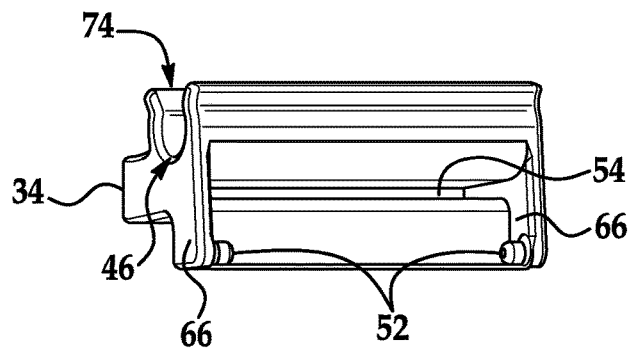
FIG. 7A is an illustration of a perspective view of the receptacle.

The retention knobs 52 allow the installer to install the receptacles on the spring clip 32 prior to installation of the spring clip 32 on the frame 30. The end wall flanges 66 may flex to some degree to aid in the installation of the receptacle 34 on the spring clip 32 by allowing the knobs 52 to engage the spring bend 50. This design allows the receptacle 34 to remain attached to the spring clip 32 while the spring clip 32 is being installed. As best seen in FIG. 7C, the receptacle 34 includes vertical and horizontal exterior surfaces 60, 62 respectively, which bear against and assist in retaining and sealing the structural window 26 to the window frame 30 (see FIGS. 4A and 4B).

As best seen in FIGS. 5, 6, 7A and 7C, the receptacle 34 includes a receptacle socket 46 having a socket opening 74 therein. The receptacle 34 also includes a pair of flexible guides 56 on opposite sides of the socket opening 74 which are inclined at a pre-selected angle 64 (FIG. 7C) relative to a line 104 (FIG. 4B) along which the window assemblies are assembled. The width 98 (FIG. 7C) of the socket opening 74 is slightly less than the diameter D of the retention clip plug 44, but widens to allow passage of the plug 44 when the plug 44 is inserted into the socket 46, and then snaps back to at least its former width 98, due to the spring quality of the receptacle 34. This differential in size between the diameter D of the plug 30 and the width 98 of the socket opening 74 forms a snap-fit locking feature 68 which retains the plug 38 in the receptacle 34 after assembly, thereby locking the retention clip 38 to the spring clip 32. The locking feature 68 also produces a retention force that compresses the lower end of the seal 24 against the structural window 26, thereby providing an airtight seal continuously around outboard window cavity 80 (FIG. 3A). This substantially air-tight seal resulting from compression of the seal 24 against the structural window 26 which folds and compresses the tear-shaped portion 78 against the structural window 26, may prevent air condensation and frost build up within the inboard window cavity 80.

Figure 5:
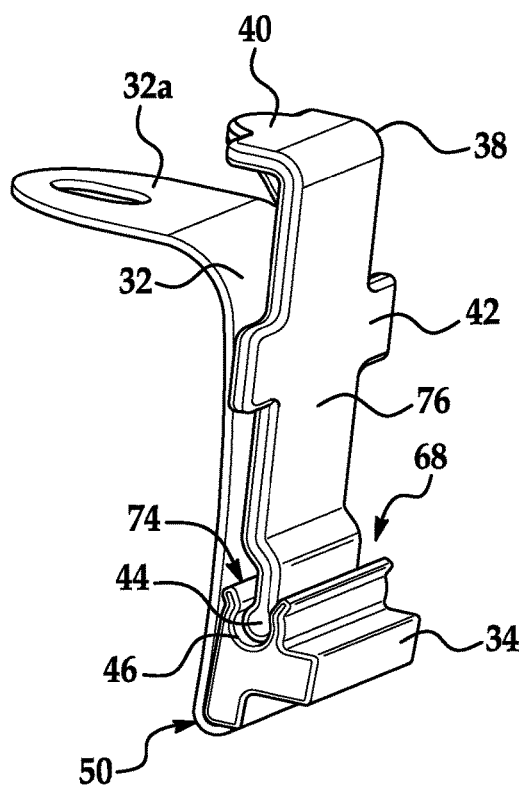
FIG. 5 is an illustration of a perspective view of one of the retention clips installed in a receptacle.
Figure 6:
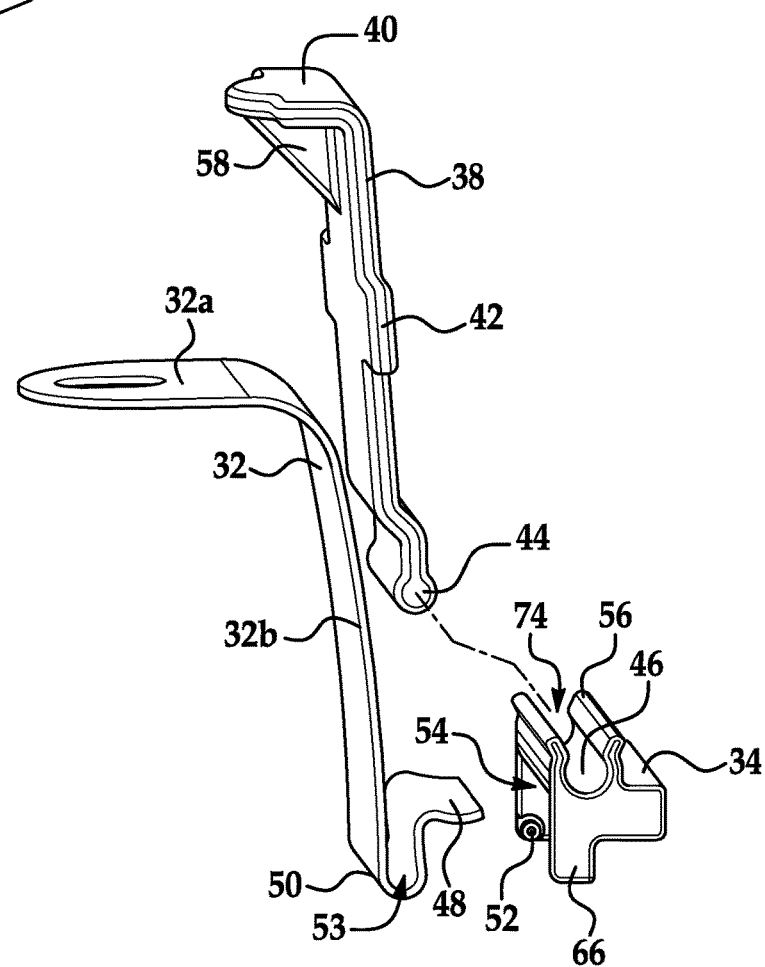
FIG. 6 is an illustration of an exploded perspective view of the assembly shown in FIG. 5.
Figure 7B:
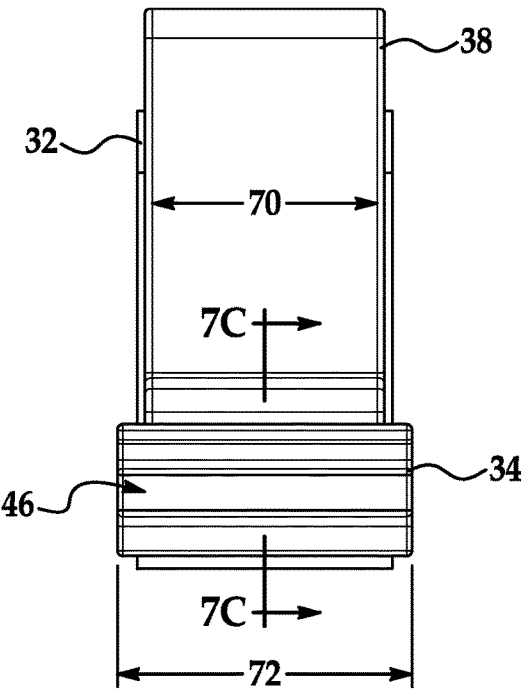
FIG. 7B is an illustration of a front view of the lower portion of the assembly shown in FIG. 6.
Figure 7C:
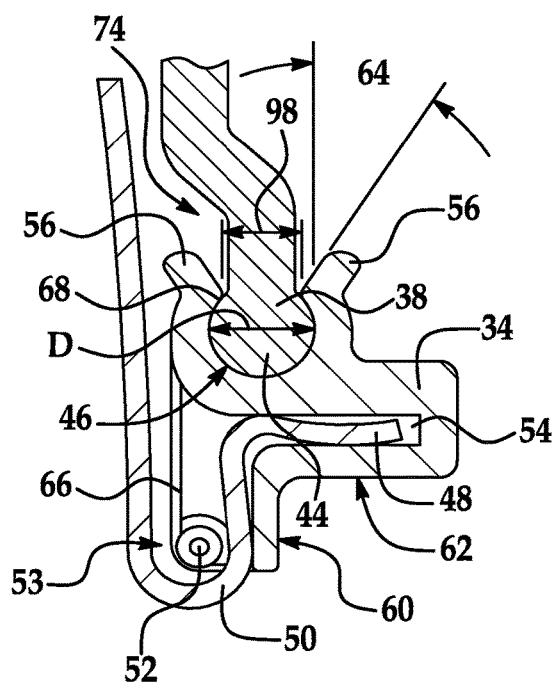
FIG. 7C is an illustration of a sectional view taken along the line 7C-7C in FIG. 7B.
Figure 8:
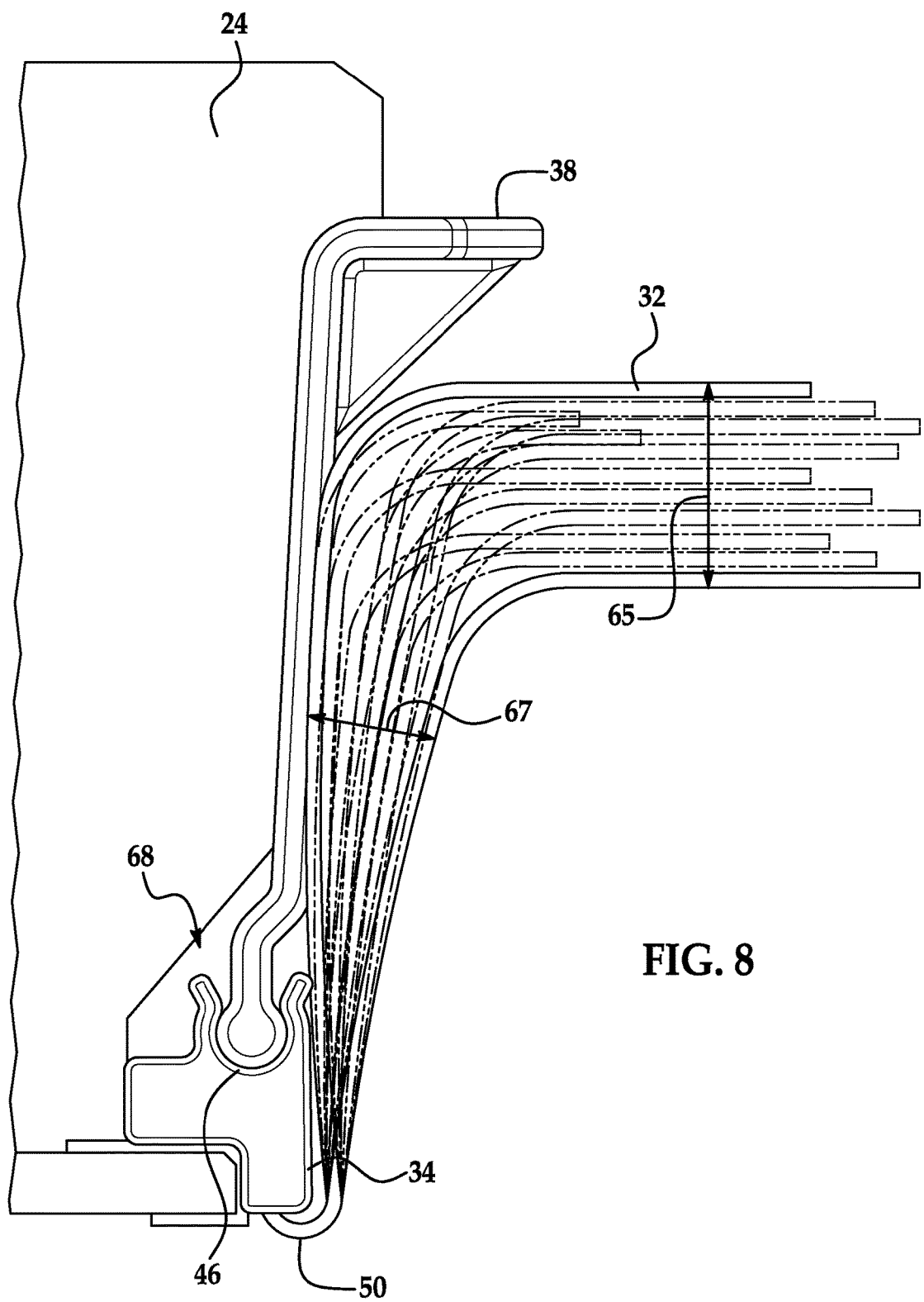
FIG. 8 is an illustration of a side view showing multiple possible installation positions of the spring clip and its relationship to the retention clip in a receptacle.
Figure 9:
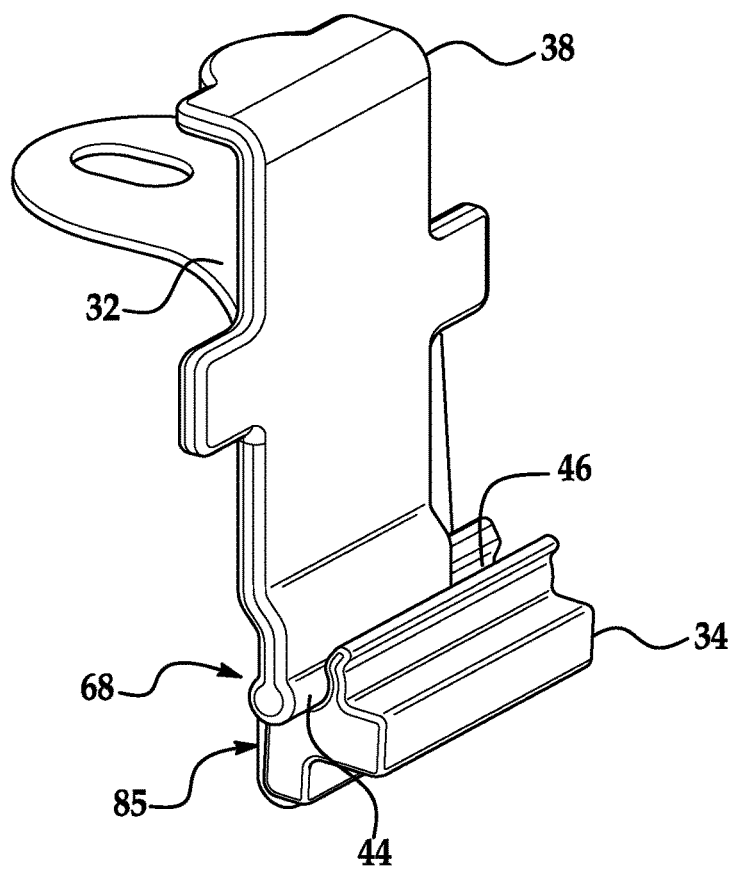
FIG. 9 is an illustration similar to FIG. 5, but showing the retention clip having been installed off-center within the receptacle.

As best seen in FIG. 7B, the receptacle socket 46 has a width 72 that is slightly greater than the width 70 of the retention clip 38. The opposite ends of the socket 46 are substantially open, as best seen in FIGS. 5, 6 and 7A. As will be discussed below, providing the socket 46 with open ends and orienting the guides 56 at an angle 64 relative to the line of assembly 104 (FIG. 4B) allows for variations that may occur during a window assembly installation process. For example, as shown in FIG. 8, the disclosed configuration of the retention clip 38 and the receptacle 34 allow for variations in the height 65 and/or angle 67 of the spring clip 32. Moreover, as shown in FIG. 9, the configuration of the socket 46 and the plug 44 allow some degree of non-alignment between the spring clip 32 and the retention clip 38, since a portion 85 of the plug 44 may extend beyond the ends of the socket 46 after assembly.

Figure 10:
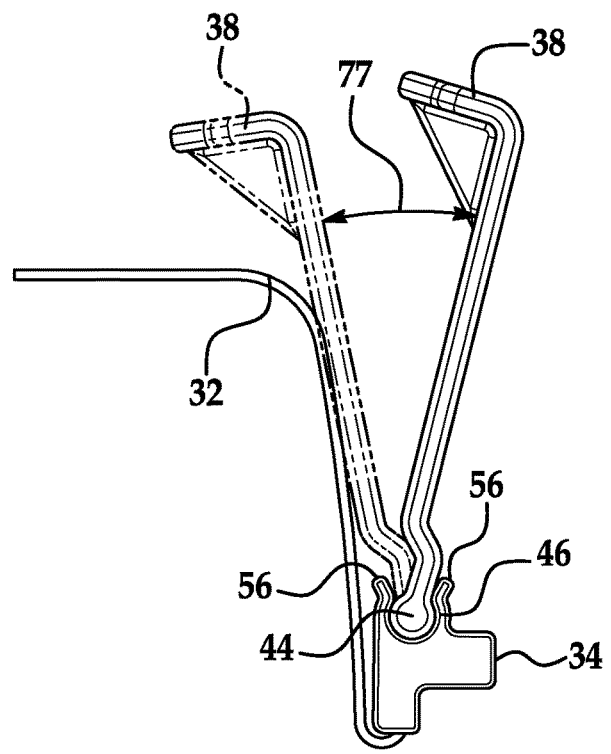
FIG. 10 is an illustration of a cross sectional view showing the range of possible angles of the retention clip within the receptacle.

Referring to FIG. 10, the inclination of the guides 56 on the receptacle 34 allow the plug 44 to rotate slightly within the socket 46 during the window assembly installation process, thereby accommodating possible variations in the angle 77 of the retention clip 38 relative to the receptacle.

Figure 11:
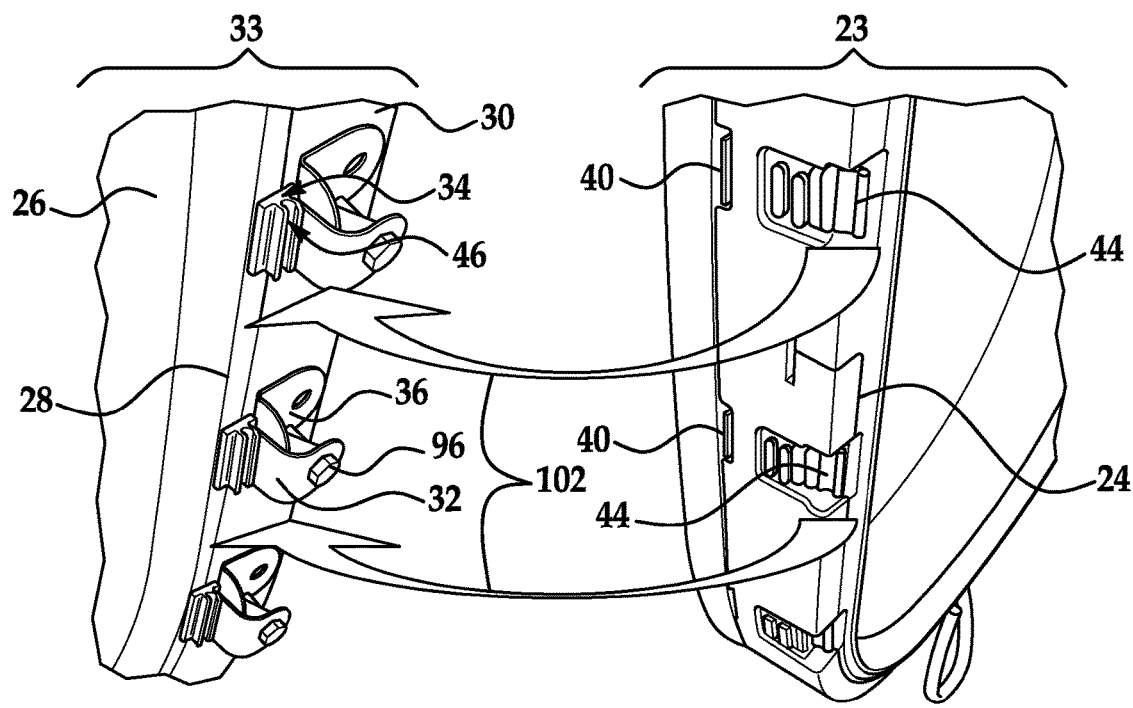
FIG. 11 is an illustration of an isometric view showing how the inboard window assembly is installed on the outboard window assembly.
Figure 12:
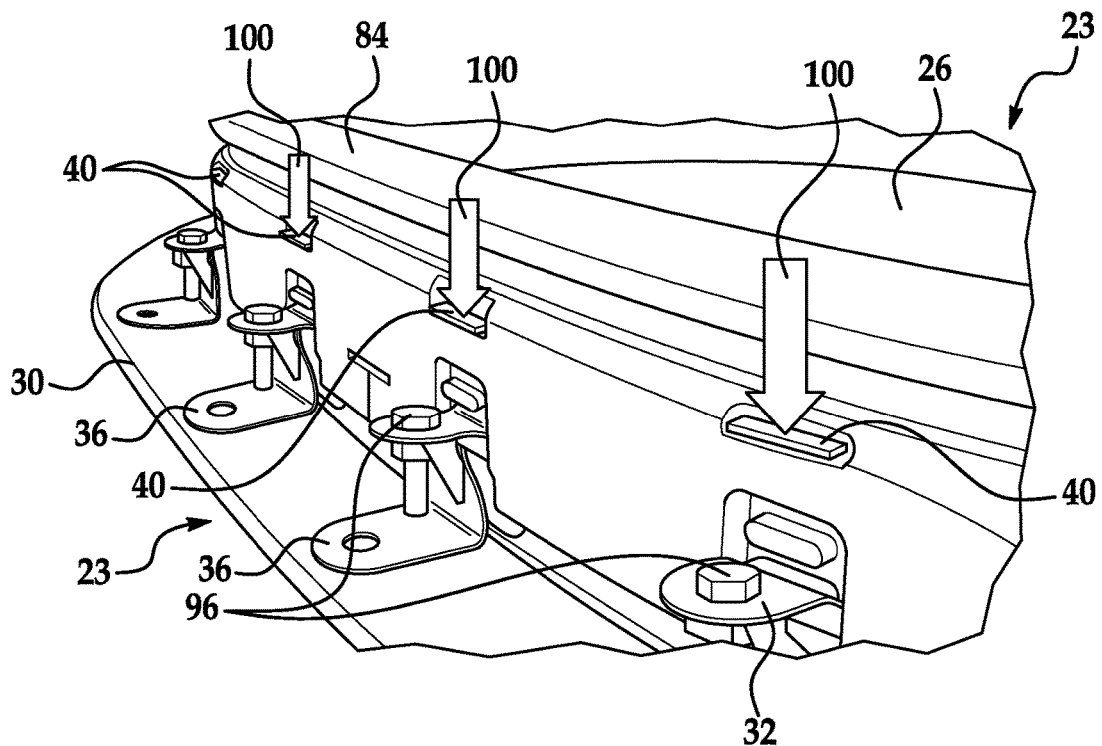
FIG. 12 is an illustration of a perspective view of the inner window assembly installed on the outer window assembly.

FIG. 11 illustrates an inner window assembly 23 about to be installed on an outer window assembly 33. As shown by the arrows 102, the inner window assembly 23 is rotated into alignment with the outer window assembly 33 such that the plugs 44 are aligned and guided into contact with corresponding ones of the receptacles 34. Then, the installer applies a force as shown by the arrows 100 using fingers or a tool to the finger tabs 40. This applied force forces the plugs 40 down into the sockets 46, thereby locking the inner window assembly 23 on the outer window assembly 33 at multiple locations around the periphery of the frame 30. The retention force produced by the locking feature 68 results in a positive and appropriate force being applied to the foam seal 24 (FIG. 11) which compresses the seal 24 against the structural window 26 and seals the outboard cavity 80 (FIG. 4A) to substantially prevent air condensation and frost build up within the inboard window cavity 80. During flight, the difference in the pressure of the air inside the cabin and the exterior atmosphere results the cabin air pressure also applying force to the inner window assembly 23 which may assist in compressing the seal against the structural window 26.

As each of the plugs 44 is forced into a corresponding one of the receptacle sockets 46, an audible "snap" may be heard by the installer, providing the installer with feedback confirmation that the particular retention clip 38 has been positively locked in the receptacle 34.

Figure 13:
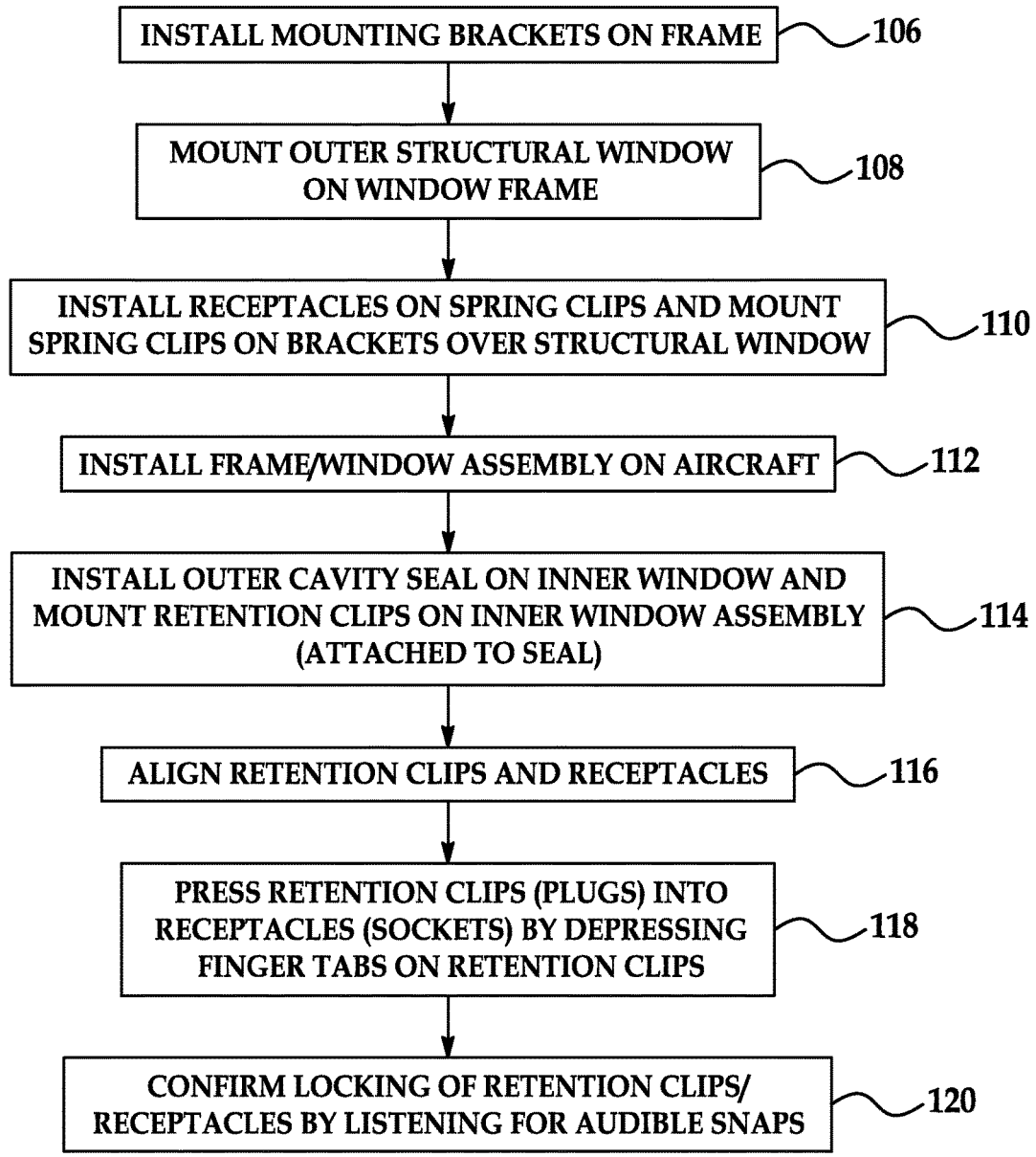
FIG. 13 is an illustration of a flow diagram of a method of installing a window assembly on an aircraft.

Attention is now directed to FIG. 13 which illustrates the overall steps of a method of installing a window 20 on an aircraft. Beginning at 106, mounting brackets 36 are installed on window frame 30. At 108, the outer structural window 26 is mounted on the frame 30. At 110, receptacles 34 are installed on spring clips 32 which are in turn secured to the mounting brackets 36 to form a pre-assemble outer window assembly 33 that is installed on the aircraft, at 112, by mounting the frame 30 on the skin 86 or other structure of the aircraft. At 114, an outer cavity seal 24 is installed on an inner window assembly 23, which may include one or more inboard windows 22, 94, as previously described, and retention clips 38 are mounted on the inner window assembly 23, as by bonding or integrally molding the retention clips 38 to the seal 24.

At 116 the inner window assembly 23 is positioned over the outer window assembly 33 such that the retention clips 38 and particularly the plugs 44 are aligned with the socket openings 74 in the receptacles 34. Next at 118, the plugs 44 of the retention clips 38 are pressed into receptacle sockets 74 by pressing the finger tabs 40 on the retention clips 38. At 120, the installer may confirm locking of the retention clips 38 with the receptacles 34 by listening for an audible "snap".

Figure 14:
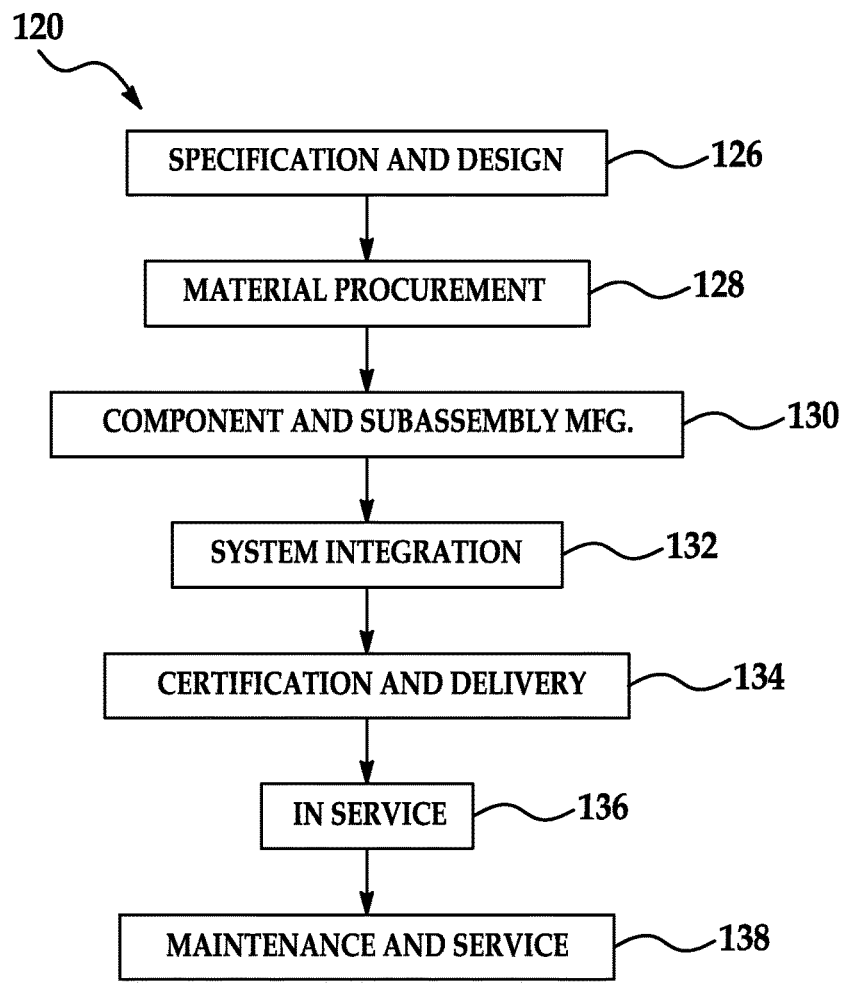
FIG. 14 is an illustration of a flow diagram of aircraft production and service methodology.
Figure 15:
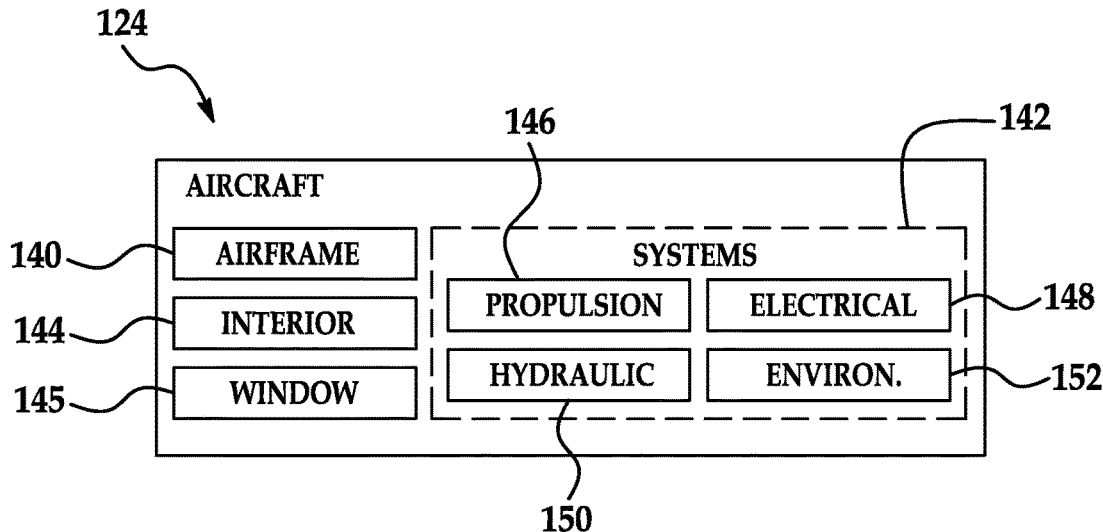
FIG. 15 is an illustration of a block diagram of an aircraft.

Embodiments of the disclosure may find use in a variety of potential applications, particularly in the transportation industry, including for example, aerospace, marine and automotive applications. Thus, referring now to FIGS. 14 and 15, embodiments of the disclosure may be used in the context of an aircraft manufacturing and service method 120 as shown in FIG. 13 and an aircraft 124 as shown in FIG. 15. Aircraft applications of the disclosed embodiments may include, for example, windows 145 installed on the airframe 140 of the aircraft 124. During pre-production, exemplary method 120 may include specification and design 126 of the aircraft 124 and material procurement 128. During production, component and subassembly manufacturing 130 and system integration 132 of the aircraft 124 takes place. Thereafter, the aircraft 124 may go through certification and delivery 134 in order to be placed in service 136. While in service by a customer, the aircraft 124 is scheduled for routine maintenance and service 138 (which may also include modification, reconfiguration, refurbishment, and so on).

Each of the processes of method 120 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 15, the aircraft 124 produced by exemplary method 120 may include an airframe 140 with a plurality of systems 142, an interior 144 and one or more windows 145. Examples of high-level systems 142 include one or more of a propulsion system 148, an electrical system 148, a hydraulic system 150, and an environmental system 152. Any number of other systems may be included. Although an aerospace example is shown, the principles of the disclosure may be applied to other industries, such as the marine and automotive industries.

Systems and methods embodied herein may be employed during any one or more of the stages of the production and service method 120. For example, components or subassemblies corresponding to production process 130 may be fabricated or manufactured in a manner similar to components or subassemblies produced while the aircraft 124 is in service. Also, one or more apparatus embodiments, method embodiments, or a combination thereof may be utilized during the production stages 130 and 132, for example, by substantially expediting assembly of or reducing the cost of an aircraft 124. Similarly, one or more of apparatus embodiments, method embodiments, or a combination thereof may be utilized while the aircraft 124 is in service, for example and without limitation, to maintenance and service 138.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A method of installing a window on an aircraft fuselage, comprising:
   mounting a window frame, having a perimeter, on an inner surface of the fuselage;
   installing a plurality of receptacles on the window frame around the perimeter thereof;
   installing a seal on a window assembly;
   mounting a plurality of retention clips on the window assembly; and
   installing the window assembly on the window frame by inserting each retention clip into one of the plurality of receptacles.

2. A method in accordance with claim 1, wherein installing the window assembly on the frame includes:
   aligning each retention clip with a respective one of the plurality of the receptacles; and
   depressing tabs on the retention clips to force plugs on the clips into sockets on the receptacles.

3. A method in accordance with claim 2, wherein depressing the tabs is continued until an audible snap is produced by the receipt of the plugs into the sockets.

4. A method in accordance with claim 1, wherein mounting the plurality of retention clips on the window assembly comprises attaching the clips to the seal.

5. A method in accordance with claim 1, further comprising centering the window assembly on the frame during the installation by allowing the retention clips to move within the receptacles during insertion.

6. A method in accordance with claim 1, wherein mounting the window frame on the fuselage further comprises:
   mounting an outboard structural window on the window frame;
   placing a first seal between the outboard window and the frame;
   mounting a plurality of brackets on the frame;
   mounting a plurality of spring clips respectively on the brackets; and
   mounting a receptacle on an end of each of the spring clips.

7. A method in accordance with claim 6, wherein installing the window assembly on the window frame comprises inserting a plug on each of the retention clips into a socket on a corresponding one of the receptacles by applying a force to one end of the retention clip until an audible snap is produced.

8. A method in accordance with claim 1, wherein the window assembly includes an inner window, and the seal is attached to the inner window, and further comprising:
   mounting the window assembly on a sidewall panel of the fuselage;
   attaching the plurality of retention clips to the seal;
   aligning the window assembly with the window frame; and
   placing the window assembly against the window frame.

9. A method in accordance with claim 8, wherein installing the window assembly on the window frame comprises inserting a plug on each of the retention clips into a socket on a corresponding one of the receptacles by applying a force to one end of the retention clip until an audible snap is produced.

10. A method in accordance with claim 8, wherein installing the window assembly on the window frame comprises:
    aligning each retention clip with a respective one of the plurality of the receptacles; and
    depressing tabs on the retention clips to force plugs on the clips into sockets on the receptacles.

11. A method of installing a window assembly on an aircraft fuselage, comprising:
mounting a window frame, having a perimeter, on an interior surface of the fuselage;
installing a plurality of receptacles around the perimeter of the window frame on the interior surface of the fuselage;
installing a seal on a window assembly;
mounting a plurality of retention clips on the window assembly; and
inserting each retention clip into a respective one of the receptacles, to attach the window assembly to the window frame.

12. A method in accordance with claim 11, wherein installing the window assembly on the frame includes:
aligning each retention clip with a respective one of the plurality of the receptacles; and
depressing tabs on the retention clips to force plugs on the clips into sockets on the receptacles.

13. A method in accordance with claim 12, wherein depressing the tabs is continued until an audible snap is produced by the receipt of the plugs into the sockets.

14. A method in accordance with claim 11, wherein mounting the plurality of retention clips on the window assembly comprises attaching the retention clips to the seal.

15. A method in accordance with claim 11, further comprising centering the window assembly on the frame during the installation by causing the retention clips to move within the receptacles during insertion.

16. A method of installing a window on a fuselage of an aircraft, comprising:
assembling an outer window assembly by—
mounting a window frame on the fuselage;
mounting an outboard structural window on the frame;
placing a first seal between the outboard window and the frame;
mounting a plurality of brackets on the frame;
mounting a plurality of spring clips respectively on the brackets;
mounting a receptacle on an end of each of the spring clips;
assembling an inner window assembly by—
mounting an inner window on a sidewall panel of the fuselage;
attaching a second seal to the inner window;
attaching a plurality of retention clips to the second seal;
aligning the inner and outer window assemblies;
placing the inner window assembly on the outer window assembly; and
inserting a plug on each of the retention clips into a socket on a corresponding one of the receptacles by applying a force to one end of the retention clip until an audible snap is produced, to attach the inner window assembly to the outer window assembly.

17. A method in accordance with claim 16, wherein applying a force to one end of the retention clip comprises depressing a tab on the one end of the retention clip to force the plug into the respective socket.

18. A method in accordance with claim 16, further comprising centering the inner window assembly on the frame during the installation by allowing the retention clips to move within the receptacles during insertion.

* * * * *